(12) United States Patent
Nicolai

(10) Patent No.: US 7,338,058 B2
(45) Date of Patent: Mar. 4, 2008

(54) BICYCLE FRAME WITH AN INTEGRATED GEAR HOUSING, AND A GEAR HOUSING FOR A BICYCLE FRAME

(76) Inventor: Karlheinz Nicolai, Külftalstrasse 18, 31093 Hoyershausen (DE)

( * ) Notice: Subject to any disclaimer, the term of this patent is extended or adjusted under 35 U.S.C. 154(b) by 187 days.

(21) Appl. No.: 10/921,304

(22) Filed: Aug. 19, 2004

(65) Prior Publication Data
US 2005/0062254 A1   Mar. 24, 2005

(30) Foreign Application Priority Data
Aug. 21, 2003   (DE) ................. 103 39 207

(51) Int. Cl.
*B62M 1/02* (2006.01)
(52) U.S. Cl. ...................... 280/260; 475/296
(58) Field of Classification Search ................ 280/260, 280/261, 295; 74/347; 475/296
See application file for complete search history.

(56) References Cited
U.S. PATENT DOCUMENTS

| 4,955,247 | A  |   | 9/1990  | Marshall |
|-----------|----|---|---------|----------|
| 5,873,590 | A  | * | 2/1999  | Abe et al. .................. 280/259 |
| 5,979,924 | A  | * | 11/1999 | D'Aluisio et al. .......... 280/261 |
| 6,079,726 | A  |   | 6/2000  | Busby |
| 6,394,477 | B1 | * | 5/2002  | Cellini ........................ 280/260 |
| 6,419,252 | B1 | * | 7/2002  | Park et al. .................. 280/237 |
| 6,688,625 | B1 | * | 2/2004  | Schreuder et al. .......... 280/260 |
| 6,852,060 | B1 | * | 2/2005  | Ash ............................ 475/296 |
| 2003/0080529 | A1 | * | 5/2003 | Morita et al. ............... 280/260 |

FOREIGN PATENT DOCUMENTS

| DE | 195 24 271 A1 | 1/1997 |
| DE | 197 50 659 A1 | 5/1999 |
| DE | 202 01 787 U1 | 7/2002 |
| JP |    3157286    | 7/1991 |
| WO | WO 99/46159   | 9/1999 |
| WO | WO 01/15963   | 3/2001 |

* cited by examiner

Primary Examiner—Tony Winner
(74) Attorney, Agent, or Firm—Greenblum & Bernstein, P.L.C.

(57) ABSTRACT

A bicycle frame with a seat tube (1), a headset tube (3), a pedal-bearing housing (5), and a gear housing (6) is characterized by the fact that the pedal-bearing housing (5) and the gear housing (6) are directly connected to each other.

30 Claims, 13 Drawing Sheets

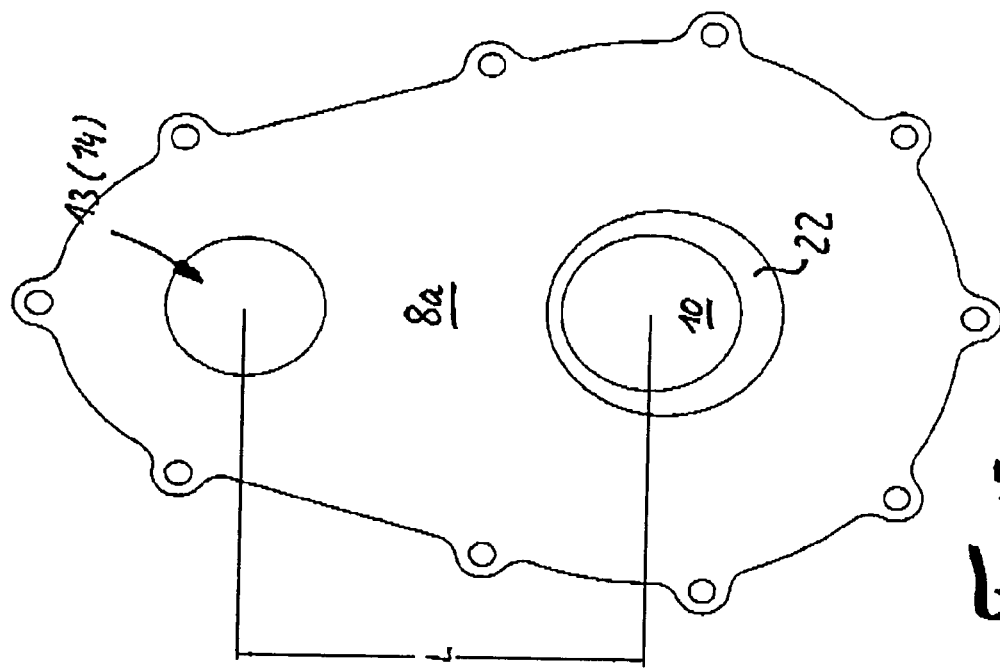
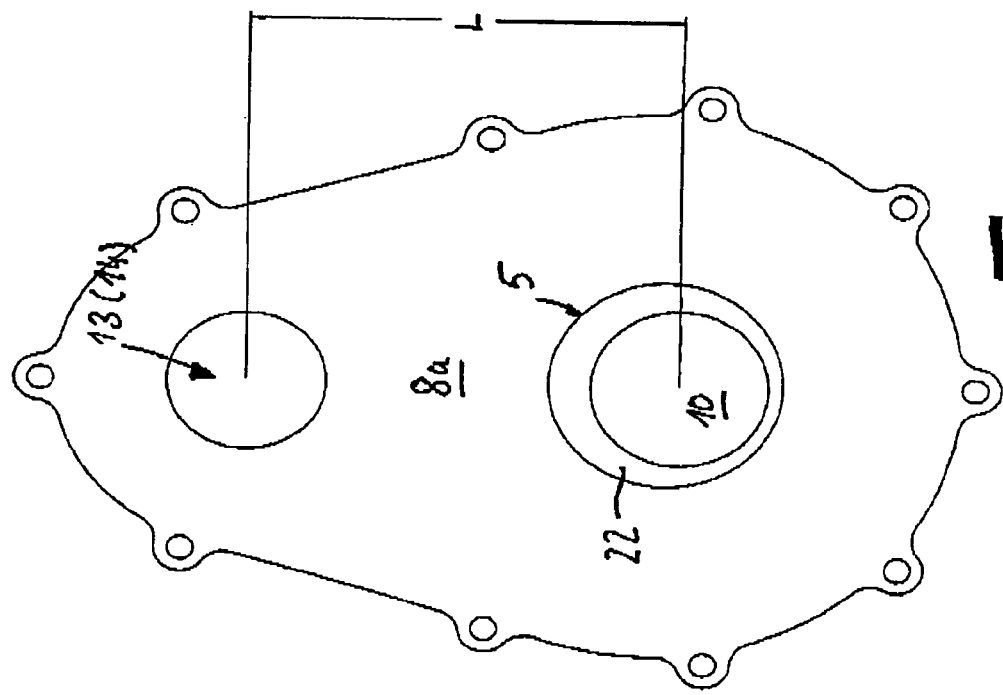

BICYCLE FRAME WITH AN INTEGRATED GEAR HOUSING, AND A GEAR HOUSING FOR A BICYCLE FRAME

FIELD OF THE INVENTION

The invention relates to a bicycle frame exhibiting a seat tube, a headset tube, a pedal-bearing housing, and a gear housing, and also relates to a structural component for use in the bicycle frame.

BACKGROUND OF THE INVENTION

A bicycle frame is known, e.g., from WO 01/15963. In bicycles the chain drive has established itself. Many types of bicycles are equipped with a derailleur or with a hub gearing on the rear wheel. In the case of a derailleur, the design dictates that the components are externally mounted on the frame or the rear-wheel, where they are exposed to dirt, since they are continuously subject to the effects of weather. The high degree of effectiveness exhibited by a derailleur when new is drastically diminished as a result of dirt, so that a significant portion of the force applied by the driver must be expended to overcome the resistances within the gearing. In the case of a fall, or upon contact with rocks or branches, the components can be damaged or torn from the frame. A hub transmission eliminates these disadvantages.

However, when the gears are integrated into the back wheel hub the weight of the back wheel increases. When the gear is moved to the frame the mass of the back wheel is reduced, which has a beneficial effect, particularly in the case of spring-loaded bicycles, since the driving comfort increases with the reduction of unsprung masses. Particularly in the case of so-called mountain bikes, which are used in the open country, a reduction in the mass of the rear wheel has a noticeable effect.

In rapid downhill travel not only the increased travel comfort but also the increased driving safety is important. If large spring paths are to be realized the drive chain must run over a chain adjuster so that the changing distance between the rotating axis of the back wheel and the rotating axis of the drive pinion can be equalized. In order to forego the use of a chain adjuster the transmission is integrated into the frame in such a way that the rotating axis of the gear output lies close to the center of the rear wheel trajectory.

A bicycle frame into which the gearing has been integrated is very complicated to produce since it is necessary to closely define not only the position of the gearing relative to the rear-wheel wing to be attached to the frame, but also the spacing of the gear from the pedal-bearing axle, by means of which the drive force is introduced. Involved here is a precision part that is produced by hand.

Known from U.S. Pat. No. 4,955,247 is a gear arrangement for a bicycle in which the pedal-bearing shaft and the gear output shaft are mounted in the same housing. The transmission of torque from the pedal-crank to the gear output shaft is performed by bevel gears.

SUMMARY OF THE INVENTION

The goal of the invention is to improve the initially described bicycle frame in such a way that its manufacture is simplified and the position of the gear and the pedal bearing can be kept within very narrow tolerances.

This problem is solved in a generic bicycle frame, in that the pedal-bearing housing and the gear housing are directly connected to each other. With this design it is not only possible to firmly fix the distance between the pedal-bearing axle and the gear axle; in addition, the position of the pedal bearing in relation to the gear is always defined and the bicycle frame can be structured around the pedal bearing and the gear housing. If the pedal-bearing housing and the gear housing are constructed as a single piece the ease of handling the bicycle is increased.

The bicycle frame advantageously comprises a conventional tubular frame, which also exhibits an upper tube and a lower tube. The gear housing can then be connected both to the seat tube and with the lower tube, thereby giving the frame a high degree of stability. The gear housing is advantageously welded to the seat tube and the lower tube. It can also be cemented. Cementing is particularly appropriate when a carbon-fiber frame is employed. The gear housing can be closed on both sides with lids so as to facilitate the installation of the components.

If a lid has a plurality of parts and constitutes another housing, this housing can be used to contain a drive arrangement that transmits the torque of the pedal-bearing axle to the gear input shaft.

It is advantageous if the longitudinal axis of the gear housing is closer to the headset tube than is the longitudinal axis of the pedal-bearing housing.

A structural component for use in the bicycle frame consists of the gear housing, the pedal-bearing housing that borders the gear housing, and the lids on either side. The component will advantageously consist of aluminum, in order to reduce weight. Installed in the gear housing is a planetary gear or a spur gear. The gears permit switching.

The free-wheel is integrated into the gear. This reduces the mass of the rear-wheel, and the travel characteristics of the bicycle are consequently improved due to the smaller unsprung masses. Furthermore, a very simple hub design can be used, one which is highly maintenance-friendly and is particularly insensitive to disruptive influences.

The torque is advantageously transmitted from the pedal-bearing axle to the gear input shaft by means of gear wheels and a chain or a toothed belt. The torque can also be transmitted by a pure toothed-gear arrangement or by a crank gear. In the case of power transmission by means of a crank gear, the gear will ideally have at least two crankshafts.

If the pedal-crank is eccentrically positioned in an eccentric bushing, the distance between the pedal-crank and the gear is adjustable, so that transmission of the primary drive can be adjusted to accommodate the driver by allowing the use of different drive pinions; this is particularly useful when the bicycle is used in competitive sports.

If the housing is sealed, the sensitive components that are housed inside it are protected from the effects of weather. The primary drive (from the pedal-crank to the gear input shaft) can then be given a design that requires very little maintenance. As a result, the drive's degree of effectiveness remains constant for a long time, which is particularly useful for the rough treatment received by mountain bikes.

Ideally two recesses will be formed in the lid that closes the gear housing; the drive chain for the rear-wheel can be run through these recesses. Provided on the gear housing are articulation points for the rear-wheel wing; these points are designed so that the wing can be attached in such a way that the rotating axis of the gear output coincides with center point of the rear-wheel trajectory. With this design the chain length of a spring-mounted bicycle remains the same in all travel situations. It is impossible for the chain to jump out.

With the structural component according to the invention the platform strategy can also be converted on the bicycle.

The component serves as platform. Elements for switching, spring-mounting, total power transmission, braking, generator, and lighting can be firmly attached on it or in it. Manufacturer-specific parts can then be mounted on the component thus equipped, thereby completing the frame.

The component according to the invention has no parts that lie open in structural spaces that can be jeopardized in a crash. It is also advantageous, therefore, if the drive chain is run inside of the supporting components of the rear-wheel wing, so that it too will require a minimum of maintenance. The disclosure of priority German application 103 39 207.6, filed on Aug. 21, 2003 is incorporated herein in its entirety.

BRIEF DESCRIPTION OF THE DRAWINGS

Exemplary embodiments of the invention will next be described in greater detail with the aid of following drawing, which shows:

FIG. 12 shows a lateral of the component;
FIG. 13 shows another lateral view of the component.

DETAILED DESCRIPTION OF EMBODIMENTS OF THE INVENTION

Figure 1:
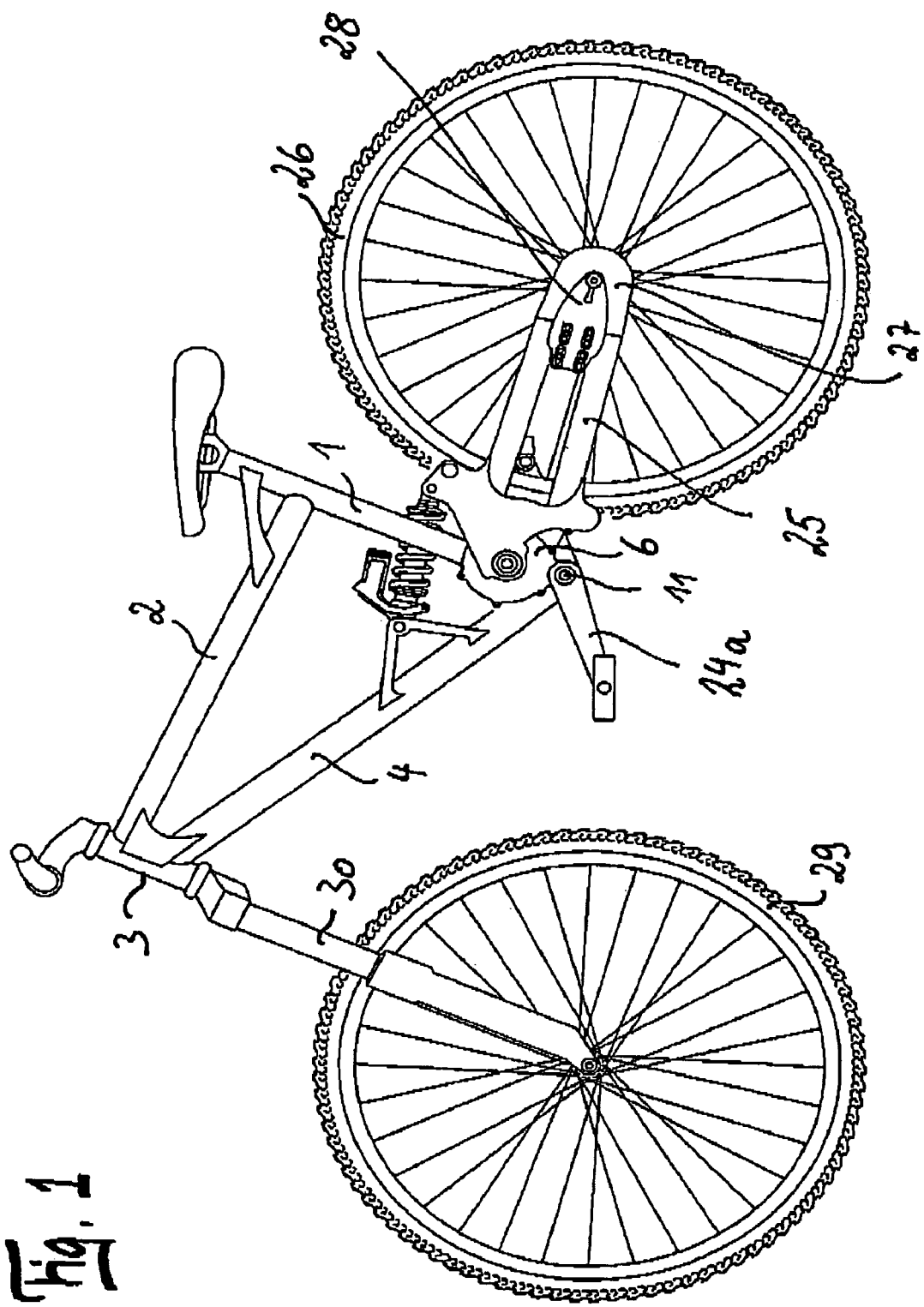
FIG. 1 shows a lateral view of a bicycle.
Figure 2:
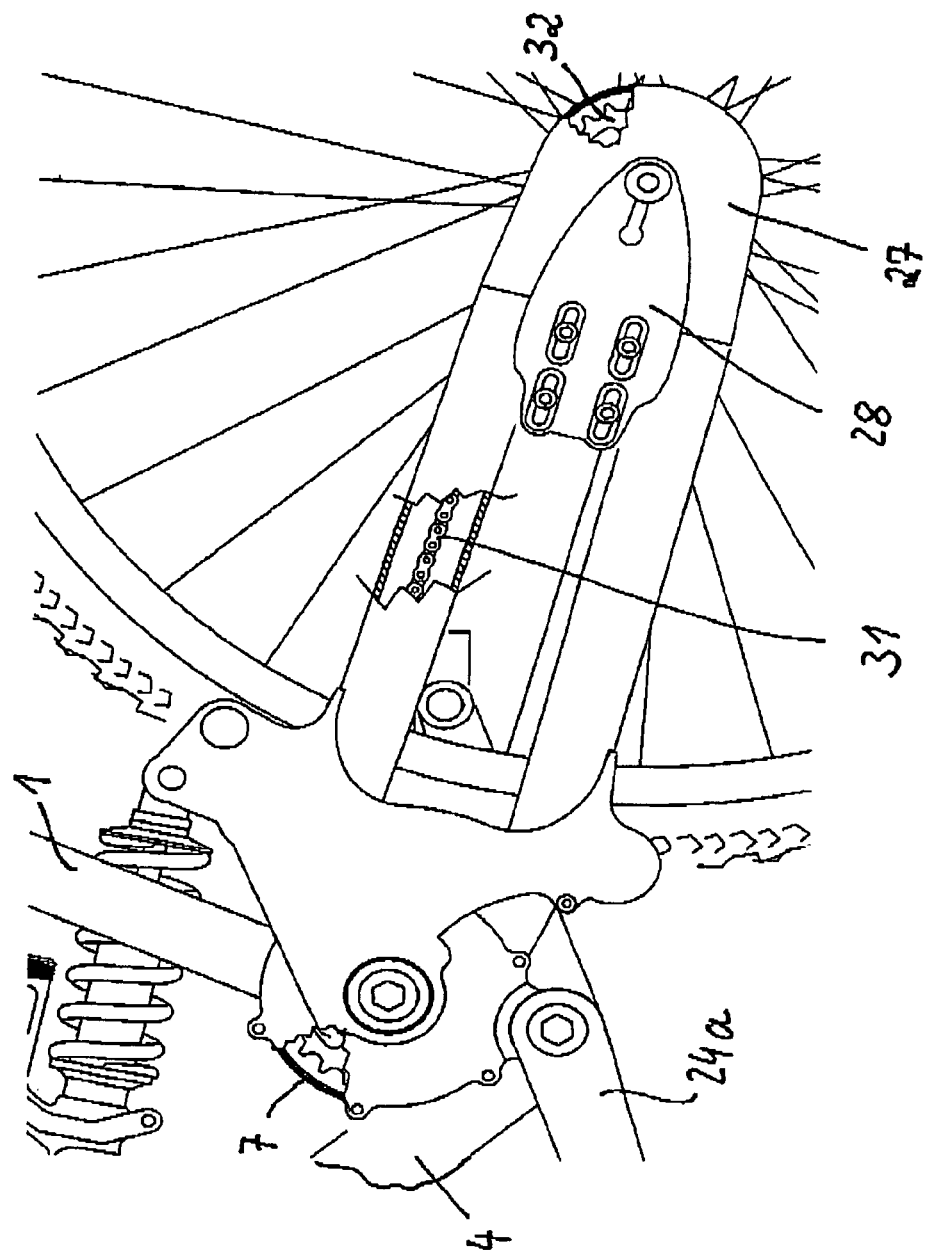
FIG. 2 shows an enlarged section from FIG. 1.

FIG. 1 shows a bicycle that is equipped with a gear arrangement according to the invention. The main frame is formed by a seat tube 1, the upper tube 2, the headset tube 3, and the lower tube 4. The gear housing 6 is connected to the lower tube 4 and the seat tube 1. Attached to the pedal-bearing shaft 11 are the pedal-cranks 24a, 24b. The spring-mounted rear-wheel wing 25 is articulated to the gear housing 6. The rear-wheel wing 25 is swivel-mounted on the output axle (not shown) of the gear 13. The rear-wheel 26 is driven by a chain 31 located inside the rear-wheel wing 25. The chain ring 32 secured to the rear-wheel 26 is located behind a maintenance cover 27. The rear-wheel 26 is mounted in sliding fashion on the wing 25 using the detachable end 28, so that the chain 31 can be tightened with a sliding action. Positioned in the headset tube 3 is the yoke 30 supporting the front-wheel 29.

Figure 3:
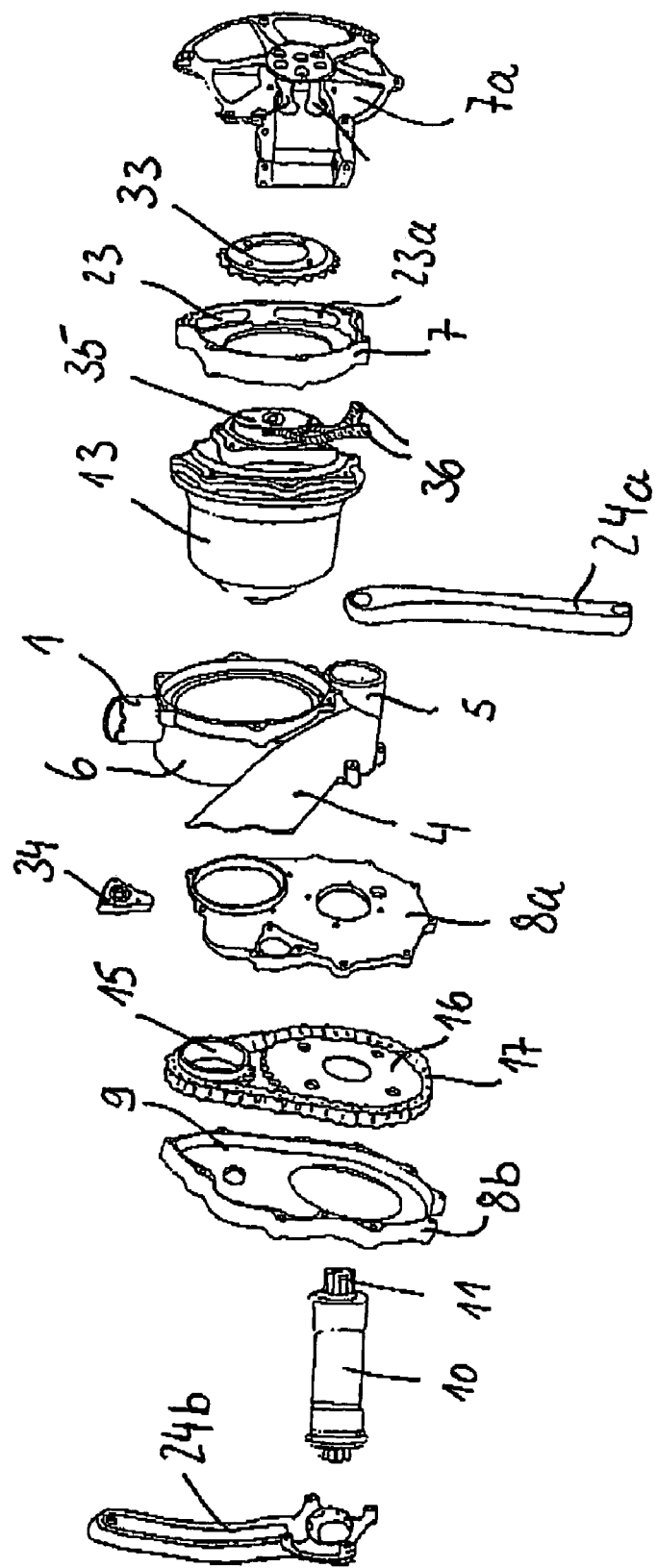
FIG. 3 shows an exploded view of the component.

FIG. 3 shows a breakdown of the component, which consists of the gear housing 6 connected to the seat tube 1 and the lower tube 4, and of the pedal-bearing housing 5, which forms a single piece with the gear housing 6 and which is connected to the lower tube 4. The pedal bearing 10, along with the pedal-bearing axle 11, is installed in the pedal-bearing housing 5. The switchable planetary gear 13 is installed in the gear housing 6. On the left side (right in the drawing), the gear is sealed by the two lids 7, 7a, inside of which runs the drive pinion 33 seated on the output shaft of the planetary gear 13. On the right (left in the drawing) the gear housing 6 and the pedal-bearing housing 5 are closed by the lids 8a, 8b, which form housing 9, in which runs the primary drive formed by the two gearwheels 15, 16, and the chain 17. The gearwheel 16 is connected to the pedal bearing 24b. The gearwheel 15 sits on the input shaft of the planetary gear 13. A seal (not depicted) is inserted between the lids 8a and 8b so that the primary drive in the housing 9 is protected from the effects of weather. Located in the additional housing 34, which is screwed together with the lid 8a, is a chain tightener for the chain 17. Provided in the lid 7a are two apertures 23, 23a through which the chain 31 leading to the rear-wheel 26 can be guided. The inner and fixed shaft 35 of the planetary gear 13 is screwed firmly to the lid 7a. The actuating cables 36 by means of which the planetary gear 13 is switched are guided outwards. The outer housing of the planetary gear 13 rotates during pedaling movement and forms the gear output along with the drive pinion 15.

Figure 4:
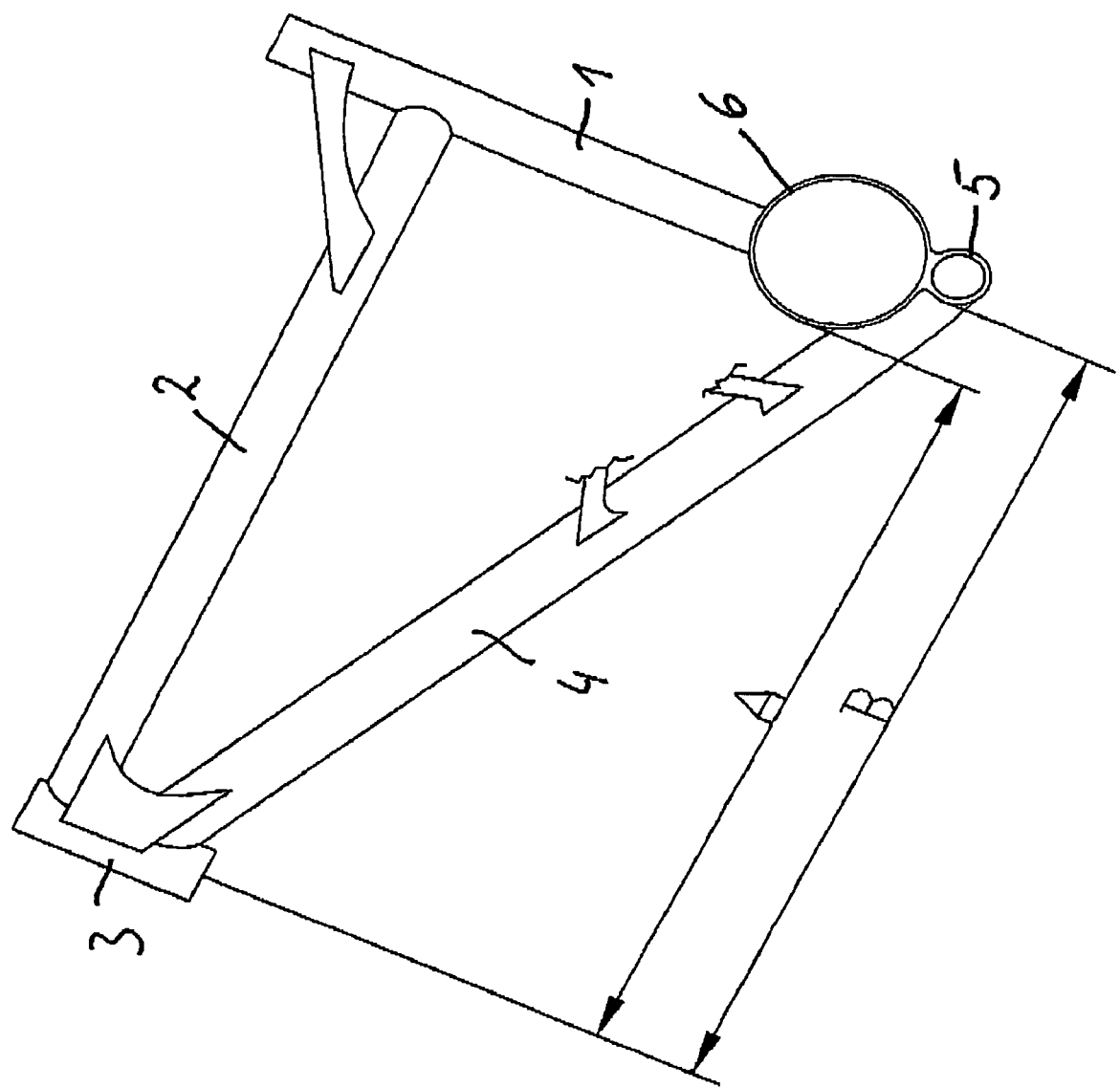
FIG. 4 shows a lateral view of the bicycle frame.
Figure 5:
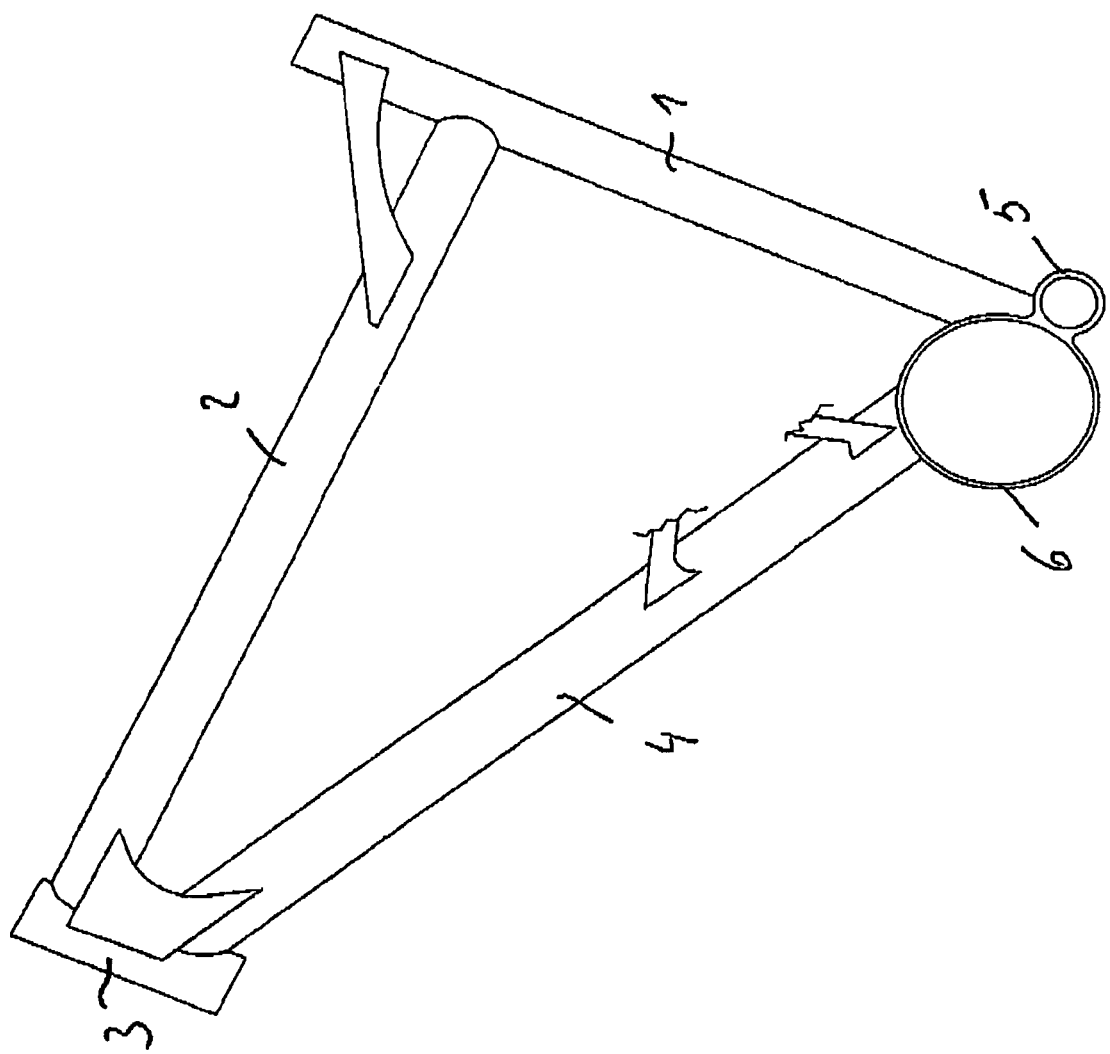
FIG. 5 shows a lateral view of another bicycle frame.
Figure 6:
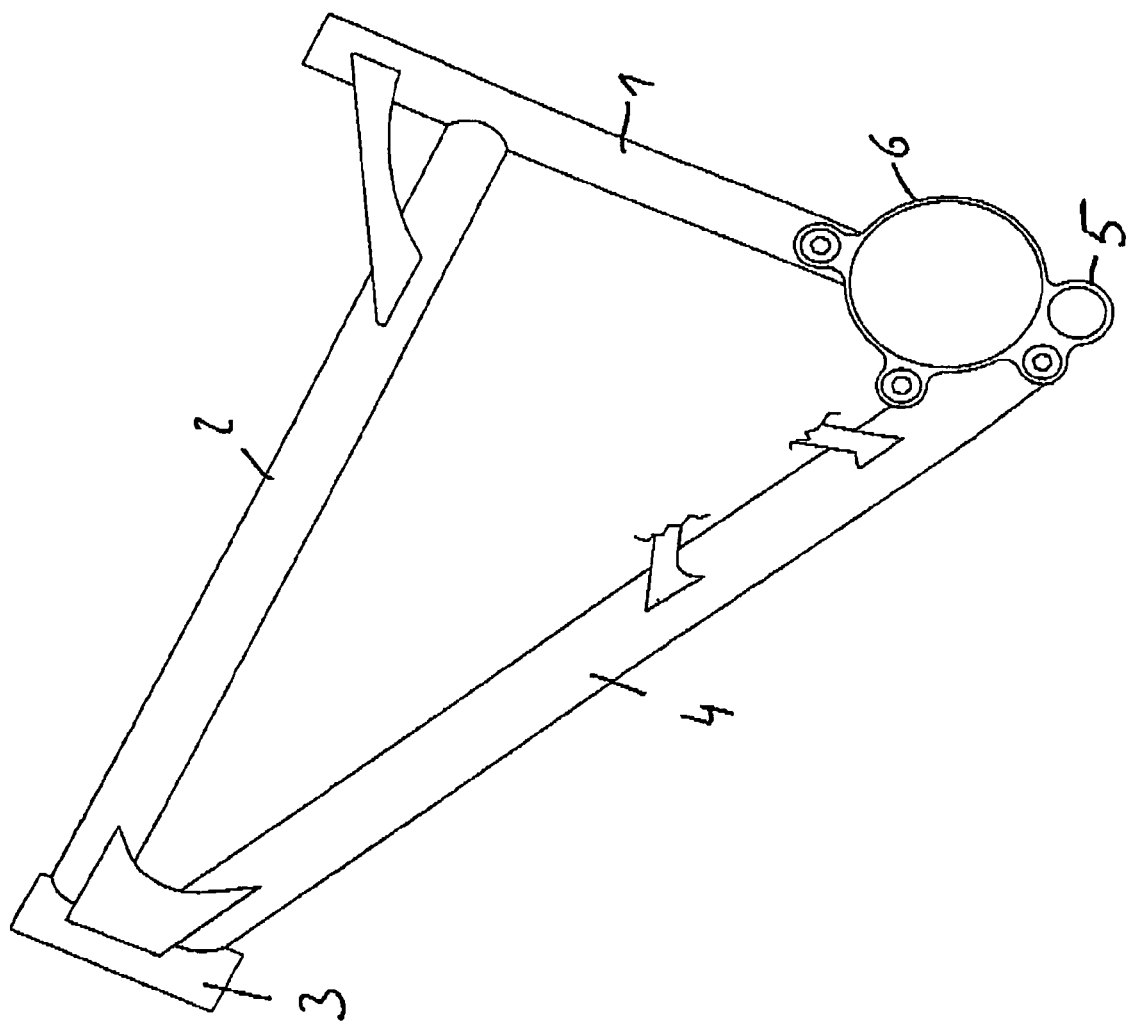
FIG. 6 shows a lateral view of another bicycle frame.
Figure 7:
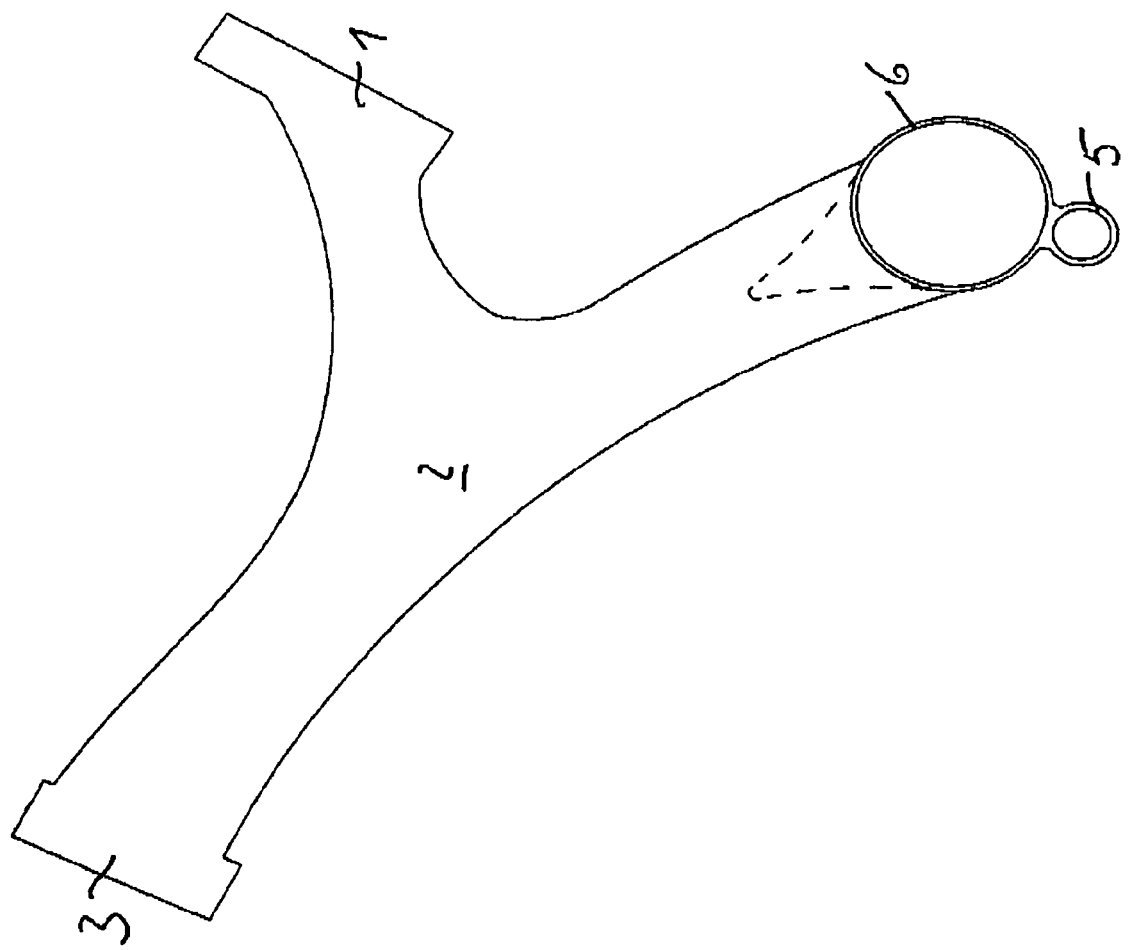
FIG. 7 shows a lateral view of a single-piece bicycle frame.
Figure 8:
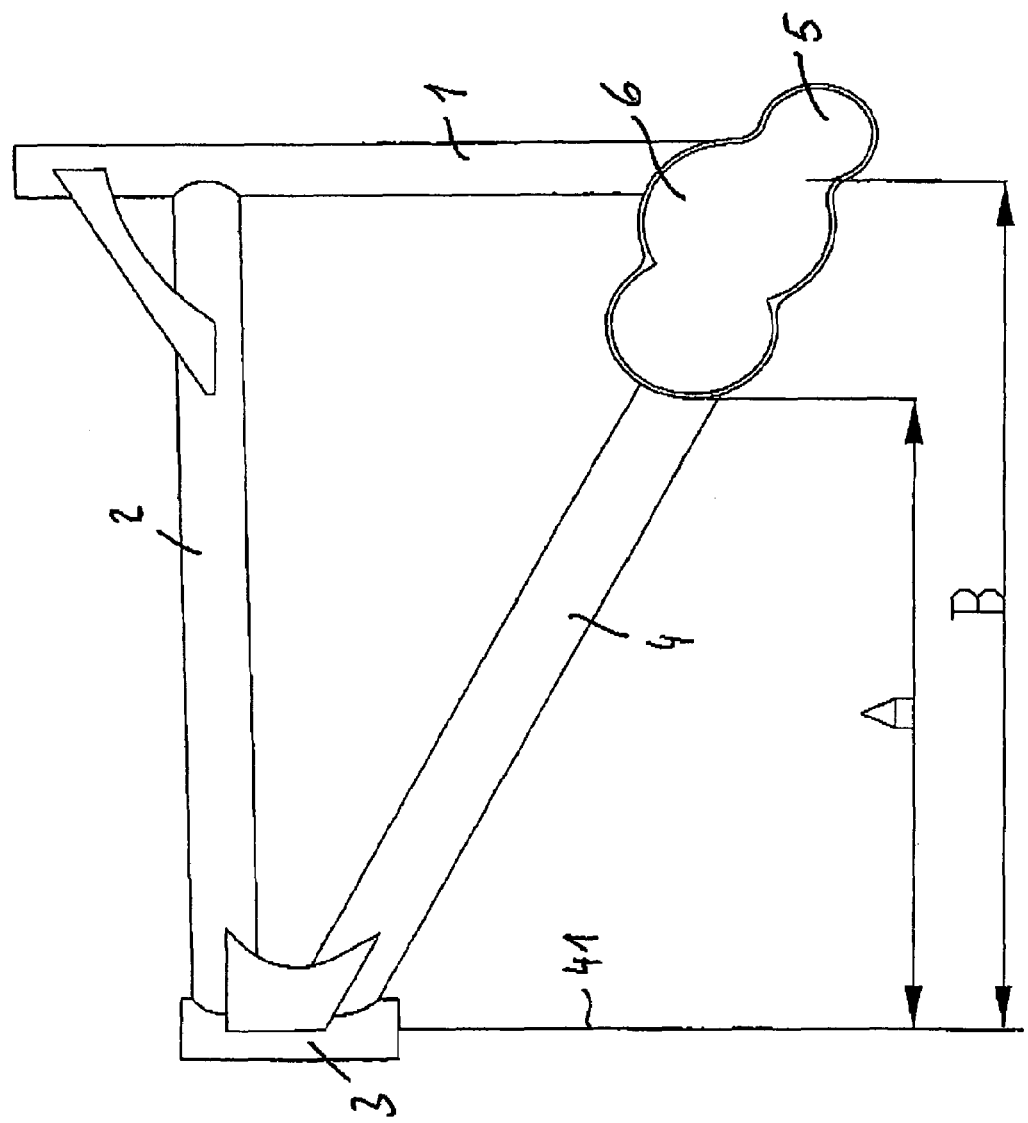
FIG. 8 shows a lateral of another bicycle frame.

As FIG. 4 shows, given a right-angle frame of reference and a hypothetical line drawn through the headset tube 3, the smallest distance A to the gear housing 6 is smaller than the parallel distance B to the pedal-bearing housing 5. FIGS. 6 to 8 show the different designs for installing the component in the bicycle frame.

FIG. 6 shows that the gear housing 6 that forms a single unit with the pedal-bearing housing 5 can be screwed together with the seat tube 1 and the lower tube 4. In the carbon-reinforced frame shown in FIG. 7 the pedal-bearing housing 5 and the gear housing 6 are cemented to a structural component.

FIG. 8 depicts a gear housing 6 for a switchable spur gearing 14 with two or more shafts. Here also, given a hypothetical line drawn through the headset tube 3, the smallest distance A to the gear housing 6 is shorter than the smallest distance to the pedal-bearing housing 5. In general it is the case that the minimum distance from the pedal-bearing housing 5 perpendicular to an imaginary extension of the headset center line is always greater than the corresponding minimum distance from the gear housing 6. If a given design has no visible housing edges, then cylindrical bodies which are coaxial with the gear shafts and which cover the gear housing 6 must be defined. The cylindrical surfaces are then to be viewed as edges.

Figure 9:
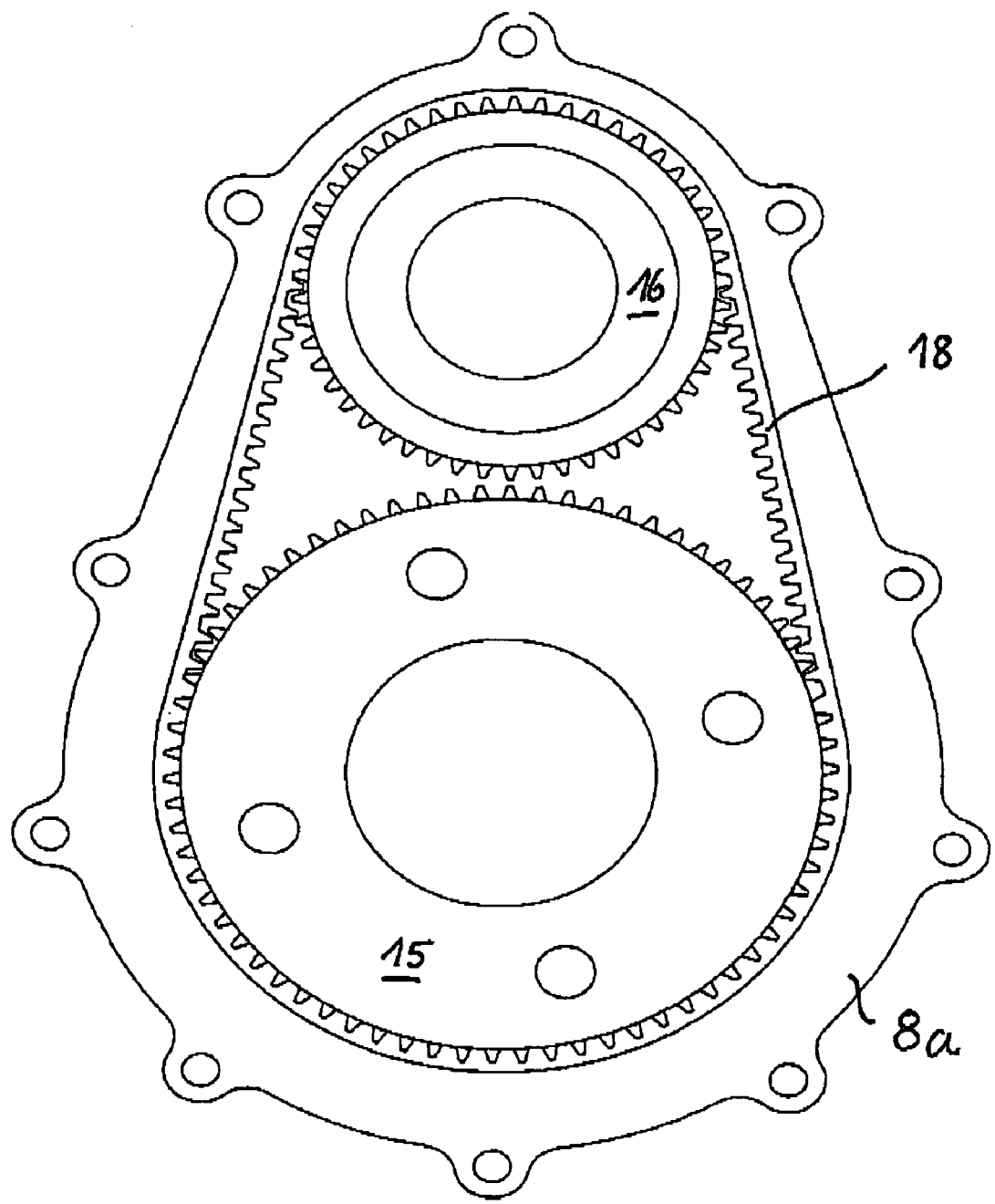
FIG. 9 shows the primary drive of the component in a first embodiment.

FIG. 9 shows an initial embodiment of the primary drive that operates in housing 9. By means of a toothed belt 18 the driving force is transmitted by the gearwheel 15, which is connected to the pedal-crank 24b, to the gearwheel 16, which is connected to the input shaft of the gear.

Figure 10:
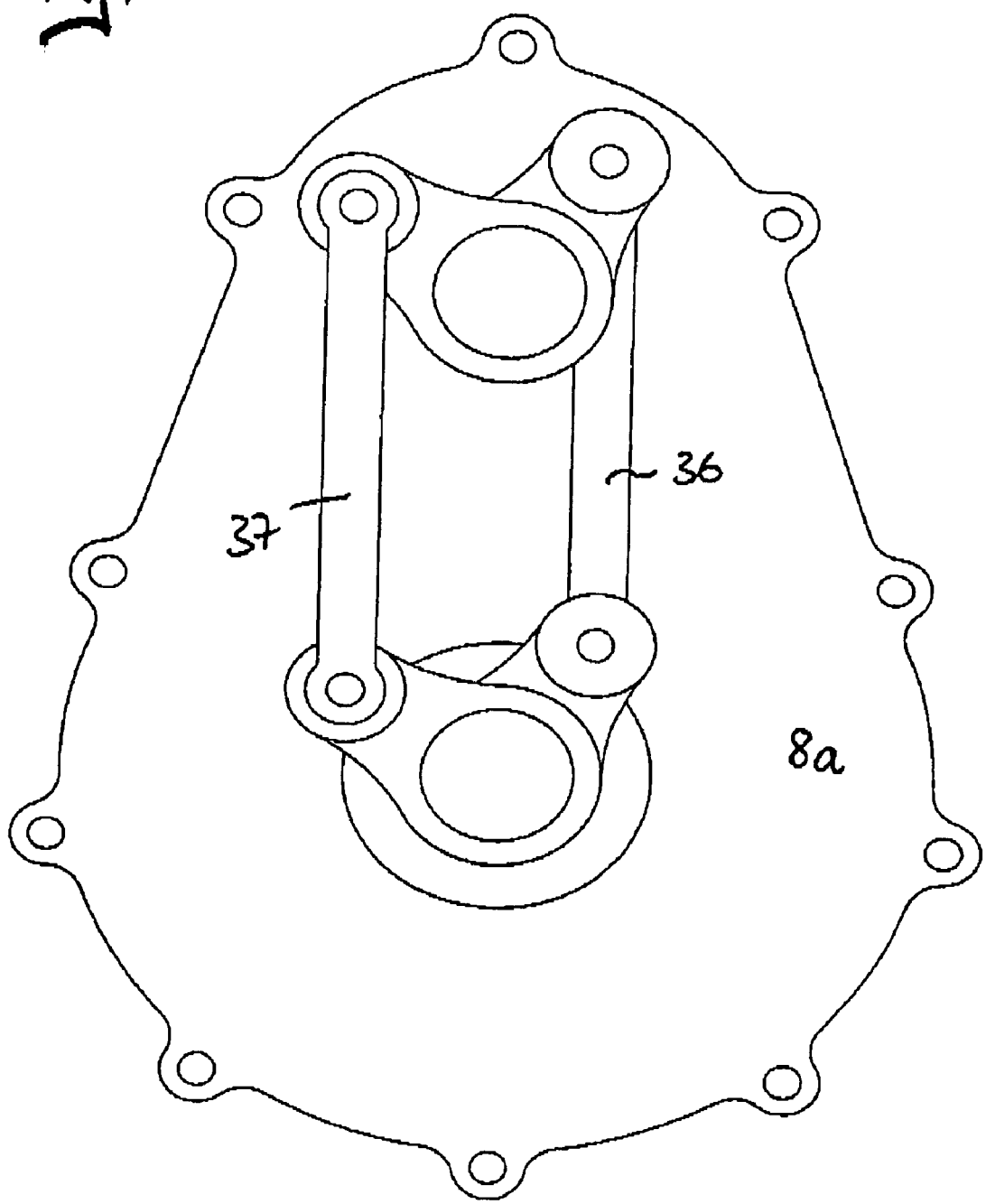
FIG. 10 shows the primary drive of the component in a second embodiment.
Figure 11:
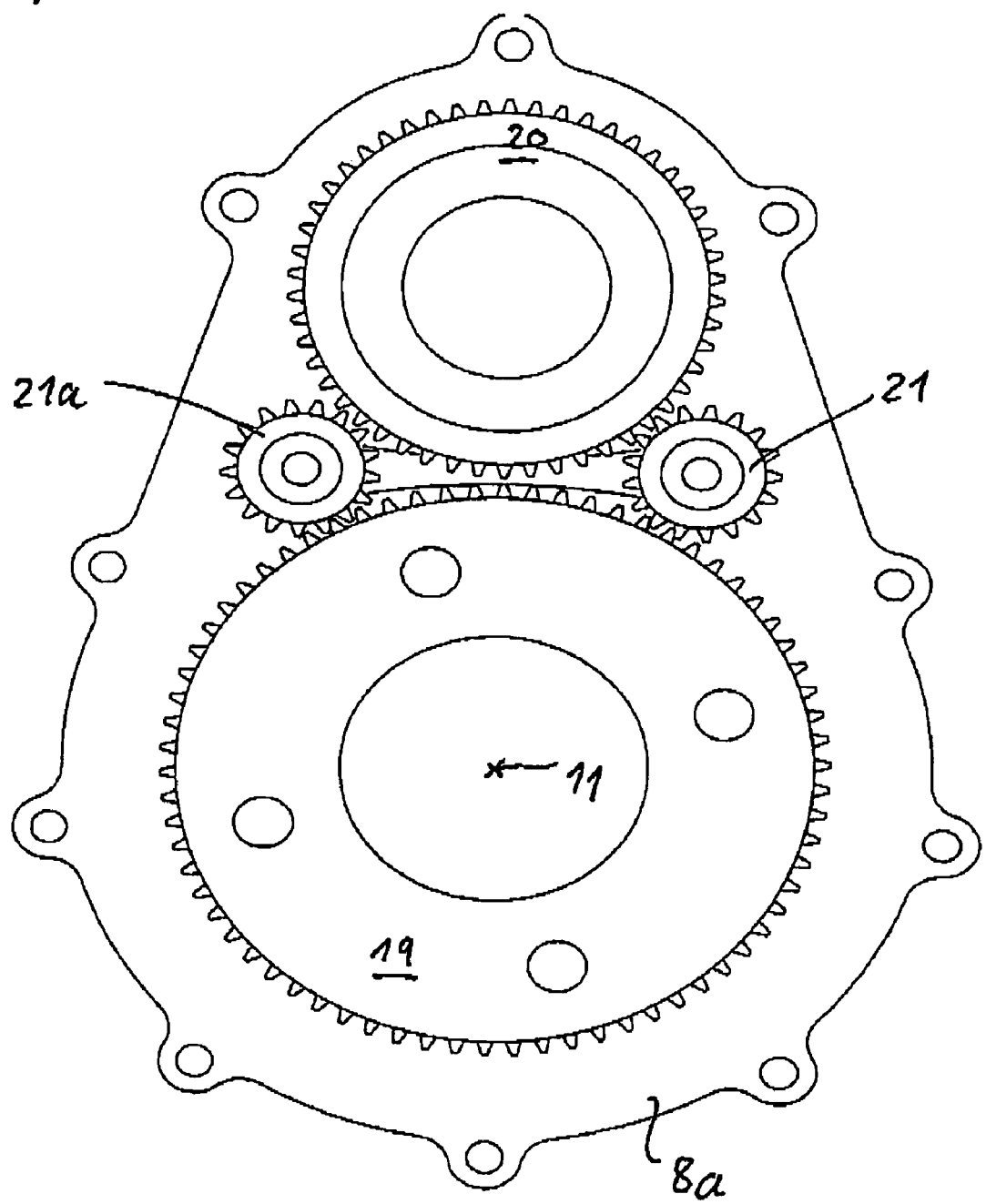
FIG. 11 shows the primary drive of the component in a third embodiment.

The primary drive depicted in FIG. 10 is formed by a crank gear with two crankshafts 36, 37. In the primary drive shown in FIG. 11 the torque is transmitted by means of four gearwheels 19, 20, 21, and 21a.

A comparison of FIGS. 12 and 13 shows that by means of an eccentric bushing 22 inserted into the pedal-bearing housing 5 the distance L from the pedal bearing 10 to the gear 13 or 15 can be adjusted, thus allowing the ergonomics of the primary drive to be adjusted to the needs of the driver.

Figure 14:
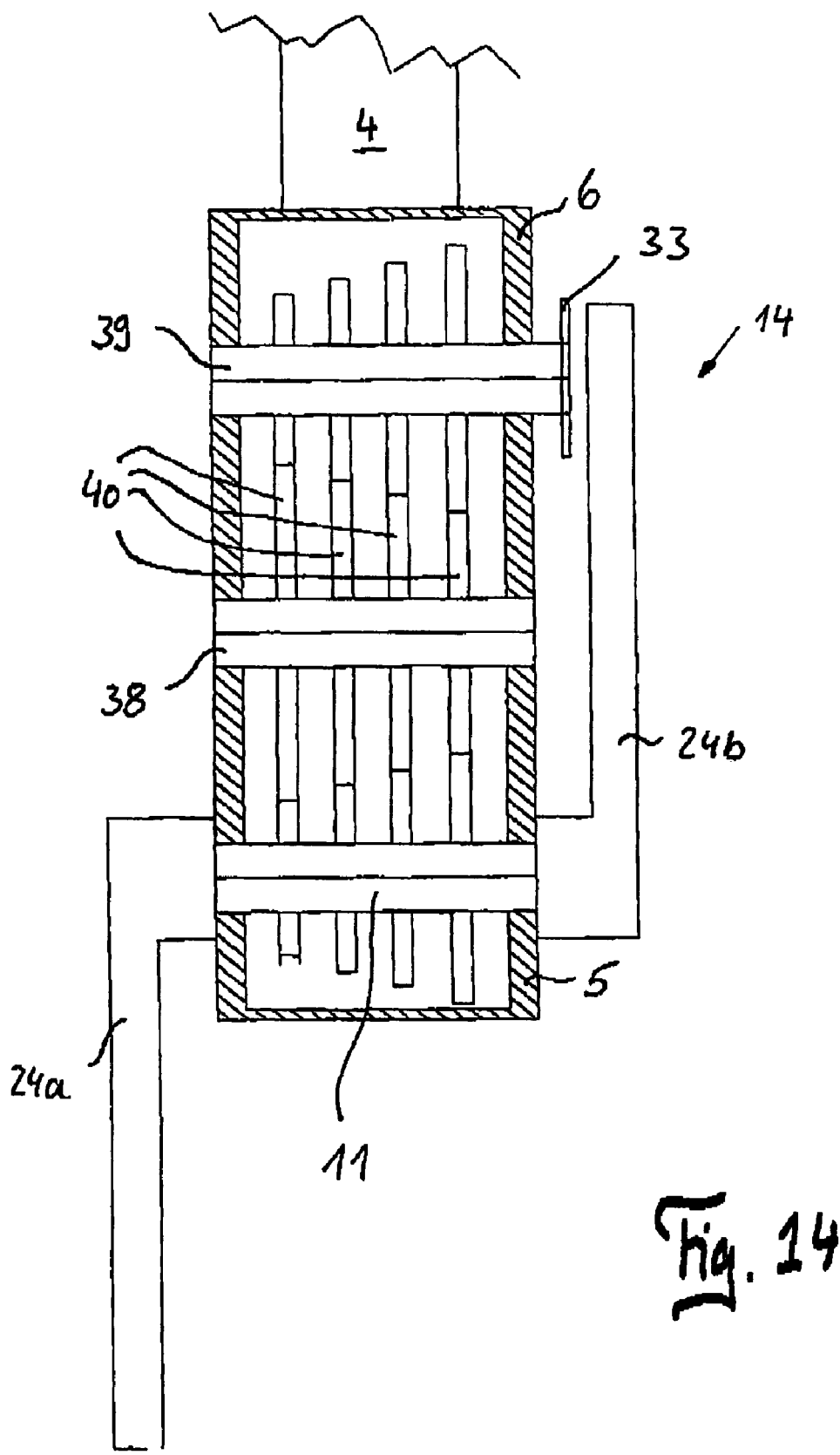
FIG. 14 shows a principal section a switchable spur gearing

FIG. 14 shows a schematic sectional representation through a switchable spur gearing 14. Two pedal-cranks 24a, 24b are attached to the pedal-bearing shaft 11. The pedal-bearing shaft 11 is rotationally mounted in the pedal-bearing housing 5. The transmissions are chosen by coupling the shafts 38, 39 to the gearwheels 40. The drive pinion 33 is located on the output shaft 39 outside of the gear housing 6.

The component, comprising the pedal-bearing housing 5 and the gear housing 6, along with its lids 7, 7a, 8a, 8b, can be milled, produced from extruded sections, welded, or cast.

Ideally the component will be cast and then finished by milling. A shock absorber for the suspension of the rear-wheel can be secured to the drive housing 6.

The invention claimed is:

1. A bicycle frame comprising a seat tube, a headset tube on an opposing side of the frame, a pedal-bearing housing connectable to the seat tube, and a gear housing directly connected to the pedal-bearing housing, wherein at least one of:
   the pedal-bearing housing has a smaller interior space than an interior space of the gear housing; and
   a rear-wheel support member is movably mounted to a portion of the frame and pivoting about an axis running through the gear housing.

2. The bicycle frame according to claim 1, wherein the pedal-bearing housing and the gear housing are a single piece.

3. The bicycle frame according to claim 1, wherein the gear housing is closed on either side with lids.

4. The bicycle frame according to claim 3, wherein at least one of the lids has a plurality of parts and forms a second housing.

5. The bicycle frame according to claim 4, wherein the second housing is provided for a gear arrangement including a pedal-bearing axle installed in a pedal-bearing housing running to a gear housed in the gear housing.

6. The bicycle frame according to claim 1, wherein a smallest distance (A) from the headset tube to the gear housing is smaller than a measured distance (B) parallel thereto leading to the pedal-bearing housing.

7. A component for use in a bicycle frame, comprising a gear housing, a pedal-bearing housing bordering on the gear housing, and lids connected to each other forming a housing for a primary drive, wherein the housing for the primary drive is separated from the gear housing by one of the lids.

8. The component according to claim 7, wherein the pedal-bearing housing and the gear housing form a single piece.

9. The component according to claim 8, wherein the pedal-bearing housing and the gear housing is produced by milling and/or casting.

10. The component according to claim 7, wherein a material of the pedal-bearing housing and the gear housing is aluminum.

11. The component according to claim 7, wherein a planetary gear is installed in the gear housing, and pedal bearings and a pedal-bearing shaft are installed in the pedal-bearing housing, and the pedal-bearing shaft is connected to the planetary gear.

12. The component according to claim 11, wherein at least the planetary gear is switchable.

13. The component according to claim 11, wherein the gear arrangement includes two gearwheels and either a chain or a toothed belt.

14. The component according to claim 11, wherein the gear arrangement is a crank gear.

15. The component according to claim 14, wherein the crank gear has at least two crankshafts.

16. The component according to claim 11, wherein a distance between the pedal bearing and the planetary gear is adjustable.

17. The component according to claim 7, wherein a gearing is installed in the gear housing, and pedal bearings and a pedal-bearing shaft are installed in the pedal-bearing housing, and the pedal-bearing shaft is connected to the gearing.

18. The component according to claims 7, wherein the housing that receives the gear arrangement is sealed.

19. A bicycle comprising the component of claim 7 and a rear-wheel support member pivotally mounted to a portion of the bicycle frame.

20. A component for use in a bicycle frame, comprising:
   a gear housing;
   a pedal-bearing housing bordering on the gear housing;
   lids connected to each other forming a housing for the pedal-bearing housing;
   a planetary gear installed in the gear housing;
   pedal bearings and a pedal-bearing shaft installed in the pedal-bearing housing; and
   the pedal-bearing shaft being connected to the planetary gear by means of a gear arrangement,
   wherein the gear arrangement includes one of:
      at least three gearwheels; and
      a crank gear.

21. The component according to claim 20, wherein the gear arrangement includes four gearwheels.

22. A component for use in a bicycle frame, comprising:
   a gear housing;
   a pedal-bearing housing bordering on the gear housing;
   lids connected to each other forming a housing for the pedal-bearing housing;
   a planetary gear installed in the gear housing;
   pedal bearings and a pedal-bearing shaft installed in the pedal-bearing housing;
   the pedal-bearing shaft being connected to the planetary gear by means of a gear arrangement; and
   a distance between the pedal bearings and the planetary gear being adjustable,
   wherein the pedal bearing is eccentrically positioned in an eccentric bushing.

23. A component for use in a bicycle frame, comprising:
   a gear housing;
   a pedal-bearing housing bordering on the gear housing; and
   lids connected to each other forming a housing,
   wherein the housing houses two non-axially aligned and spaced-apart gears and a drive chain.

24. A bicycle frame comprising:
   a seat tube;
   a headset tube on an opposing side of the bicycle frame;
   a pedal-bearing housing directly connected to a gear housing, wherein a smallest distance (A) from the headset tube to the gear housing is smaller than a measured distance (B) parallel thereto leading to the pedal-bearing housing;
   the gear housing including a gear coupled to a drive pinion;
   the drive pinion being arranged in a housing formed by two lid members;
   a pedal bearing arranged in the pedal-bearing housing and a pedal-bearing axle arranged in the pedal bearing;
   the pedal-bearing axle being connected to the gear via at least one gear wheel; and
   the at least one gear wheel being arranged in an additional housing formed by two lid members connected to each other.

25. A bicycle frame comprising:
   a seat tube;
   a headset tube on an opposing side of the bicycle frame;
   a pedal-bearing housing directly connected to a gear housing, wherein a smallest distance (A) from the headset tube to the gear housing is smaller than a measured distance (B) parallel thereto leading to the pedal-bearing housing;

the gear housing including a planetary gear coupled to a drive pinion;

the drive pinion being arranged in a housing formed by two lid members;

a pedal bearing arranged in the pedal-bearing housing and a pedal-bearing axle arranged in the pedal bearing;

the pedal-bearing axle being connected to the planetary gear via at least one gear wheel;

the at least one gear wheel being arranged in an additional housing formed by two lid members connected to each other; and a shaft of the planetary gear being coupled to one of the two lids of the additional housing.

26. A component for use in a bicycle frame, comprising:

a gear housing;

a pedal-bearing housing bordering on the gear housing;

first and second lids connected to each other forming a housing for a primary drive, wherein the housing for a primary drive is separated from the gear housing by one of the first and second lids;

a planetary gear installed in the gear housing;

pedal bearings and a pedal-bearing shaft installed in the pedal-bearing housing;

the pedal-bearing shaft being connected to the planetary gear; and the housing for a primary drive being arranged on one side of the gear housing and an additional housing arranged on an opposite side of the gear housing;

third and fourth lids connected to each other forming the additional housing, wherein the additional housing houses a drive pinion; and a shaft of the planetary gear being coupled to one of the two lids of the additional housing.

27. A bicycle, comprising:

a seat tube;

a headset tube;

a pedal-bearing housing connected to the seat tube;

a gear housing directly connected to the pedal-bearing housing; and lids connected to each other forming a housing for a drive, wherein the housing for the drive is arranged on a side of the gear housing.

28. The bicycle of claim 27, wherein the bicycle is a mountain bike.

29. The bicycle of claim 27, wherein the pedal-bearing housing borders on the gear housing.

30. The bicycle of claim 27, wherein the pedal-bearing housing has a smaller interior space than an interior space of the gear housing.

* * * * *